May 28, 1963  H. F. ECKHARDT  3,091,084
SOLID PROPELLANT CONTROL SYSTEM
Filed May 4, 1959  2 Sheets-Sheet 1

INVENTOR.
HANS F. ECKARDT
BY
ATTORNEY

INVENTOR.
HANS F. ECKARDT
BY
ATTORNEY

United States Patent Office 3,091,084
Patented May 28, 1963

3,091,084
SOLID PROPELLANT CONTROL SYSTEM
Hans F. Eckhardt, Tustin, Calif., assignor, by mesne assignments, to PneumoDynamics Corporation, Cleveland, Ohio, a corporation of Delaware
Filed May 4, 1959, Ser. No. 810,602
1 Claim. (Cl. 60—39.47)

This invention relates to reaction controls and more particularly to a reaction control system for rockets and missiles utilizing a solid propellant gas generator.

It is an important object of this invention to provide a new and improved reaction control system for missiles or the like which is compact and lightweight.

It is another important object of this invention to provide a new and improved reaction control system utilizing a solid propellant gas generator as a source of gas under pressure.

It is another object of this invention to provide a gas control system supplied by a solid propellant gas generator for use in intermittent operation which conserves the available energy during the periods in which control is not required.

It is still another object of this invention to provide a pressure gas system, the gas under pressure of which is supplied by a solid propellant gas generator, suitable for use in the stabilization of rockets and missiles and the like.

Further objects and advantages will appear from the following description and drawings, wherein.

In the past, solid propellant gas generators have not been utilized to provide the source of gas under pressure for stabilization systems of rockets and the like since the stabilization operation is generally intermittent and once a solid propellant is ignited, it burns until it is completely consumed. In a control system according to this invention, it is possible to use a solid propellant gas generator which continually burns until it is completely consumed in conjunction with a control system which provides for a conservation of the available energy contained within the gas generator by reducing the rate of burning during the no-demand period of operation.

Figure 1:
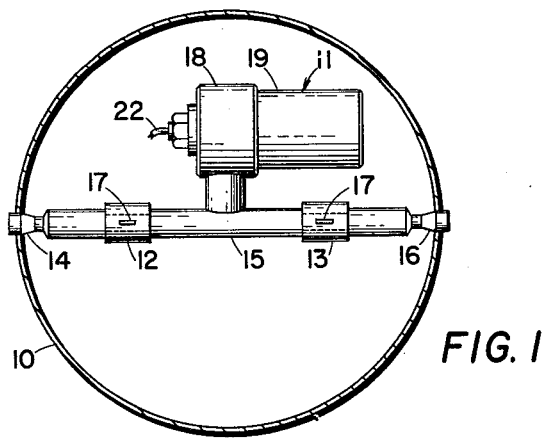
FIGURE 1 is a schematic illustration of the control system according to this invention as it would be installed in a rocket or missile to provide pitch and yaw stabilization showing the system in a no-demand condition.
Figure 2:
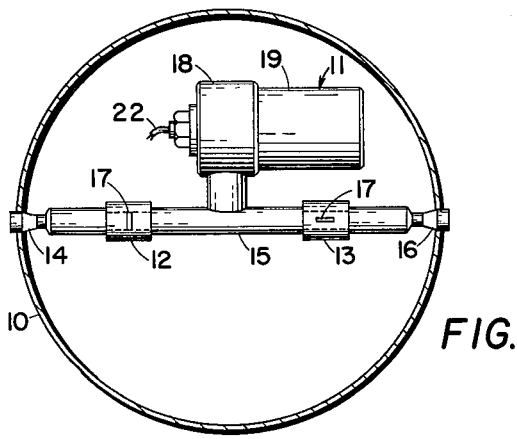
FIGURE 2 is a view similar to FIGURE 1 showing the operation of the system during a demand period in which stabilizing thrust is required.

Referring to FIGURES 1 and 2, a system according to this invention is schematically shown as it could be installed within a rocket, the outer casing of which is illustrated by the circle 10. The control system includes a solid propellant gas generator 11 connected through a manifold 15 to two control valves 12 and 13. The control valves 12 and 13 in turn are connected to opposed similar nozzles 14 and 16 respectively. The nozzles open through the rocket casing and are positioned so that when gas is flowing through both of the nozzles, the thrust developed is equal and opposite and has no net effect on the rocket. This is the condition shown in FIGURE 1 wherein the valves 12 and 13 are open. When it is desired to provide a stabilizing thrust to the left as viewed in FIGURE 2, the valve 12 is closed and all of the gas produced by the gas generator 11 flows through the nozzle 16 producing the required thrust. Conversely, if a thrust in a direction to the right is required, the valve 13 is closed while the valve 12 remains open. The valves, which will be discussed in detail below, are schematically illustrated by a vane or damper 17 which is aligned with the flow direction of the gas when the valve is opened and which extends across the valve passage when the valve is closed.

Figure 3:
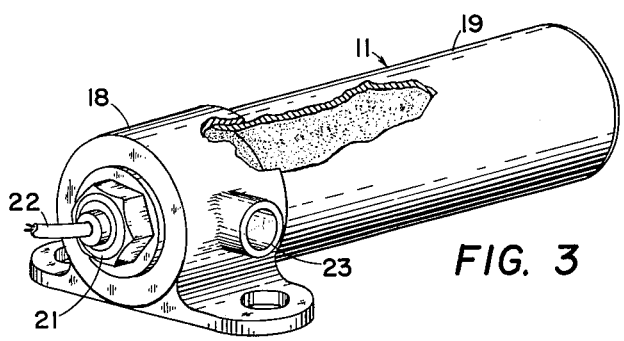
FIGURE 3 is a perspective view of a solid propellant gas generator of the type particularly suited for use in the system according to this invention.

The gas generator 11 is preferably of the type illustrated in FIGURE 3 which includes an end housing 18 which closes the open end of a cup-shaped propellant container 19. The propellant container 19 is normally formed with thin wall sections by sheet metal drawing operations and the housing can be either cast or machined. Threaded into the end of the housing 18 is an ignitor 21 which is operated by electrical current from the rocket control system supplied through an electrical connection 22. The housing is formed with a side port 23 which is connected to the manifold 15 and in turn through the valves 12 and 13 to the nozzles 14 and 16.

Figure 4:
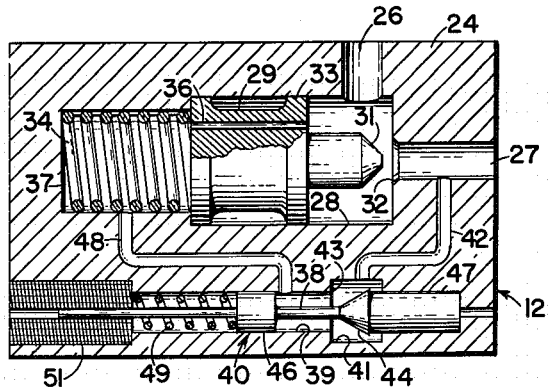
FIGURE 4 is a schematic illustration of a control valve used to control the flow of gas from the generator to the thrust nozzles in the open position.
Figure 5:
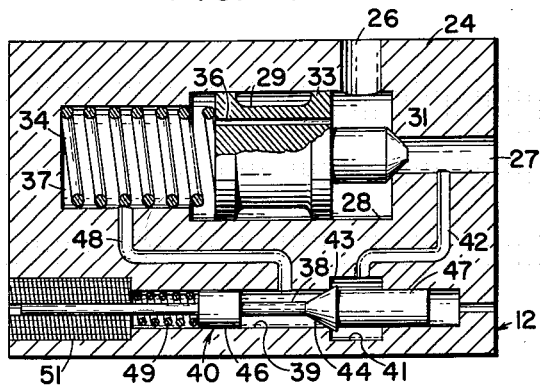
FIGURE 5 is a view similar to FIGURE 4 showing the position the valve elements assume in the closed position.

A preferred type of valve, which can be utilized to control the flow to the nozzles 14 and 16, is shown in the open and closed position in FIGURES 4 and 5 respectively. It should be understood that both of the valves 12 and 13 are similar so a detailed description of the valve 12 applies equally to the valve 13. The valve 12 is provided with a housing 24 formed with an inlet port 26 connected to the manifold 15 and an outlet port 27 connected to the nozzle 14. These two ports in turn are open to a valve chamber 28. Positioned within the valve chamber 28 is a valve poppet 29 movable from an open position shown in FIGURE 4 to a closed position shown in FIGURE 5. When the poppet 29 is in the closed position, the forward end 31 engages a valve seat 32 around the port 27 isolating the two ports 26 and 27 and preventing flow of gas from the gas generator 11 to the nozzle 14. The valve poppet 29 is formed with a piston head 33 which extends into sealing engagement with the wall of the chamber 28. Positioned on the rearward side of the piston head 33 is a spring 34 which urges the valve poppet 29 toward the closed position of FIGURE 5. A passage 36 extends through the piston head 33 and connects the valve chamber 28 to the right of the piston head 33 to a rearward chamber 37.

To operate the poppet 29, a solenoid operated pilot valve 40 is utilized. This valve includes a pilot valve member 38 positioned within a bore 39 in the valve housing 24 for axial movement between the open position shown in FIGURE 4 and the closed position of FIGURE 5. The bore 39 is formed with an enlarged portion 41 connected to the outlet port 27 through a passage 42 and a valve seat 43 engageable by a conical valving portion 44 on the valve member 38. The bore 39 to the left of the valve seat 43 is formed with the same diameter as the portion of the bore to the right of the enlarged portion 41. The valve member 38 is formed with guides 46 and 47 which closely fit the bore in these sections so that the valve member 38 is balanced and not affected by pressure. The portion of the bore 39 immediately to the left of the enlarged portion 41 is connected to the rearward chamber 37 by a passage 48. Therefore, when the valve member 38 is in the open position of FIGURE 4, the rearward chamber 37 is connected to the outlet port 27.

The flow capacity of the pasage 36 is smaller than the flow capacity of the pilot valve 40 and passages 42 and 48 so the pressure on the left side of the piston head 33 is substantially equal to the pressure in the outlet passage. The main valve is proportioned so that there will be a limited pressure drop as the gas flows into the outlet port and this pressure drop operates on the piston head 33 to overcome the spring 34 and maintain the valves open. A spring 49 normally maintains the pilot valve member 38 in the open position of FIGURE 4 and an electrical solenoid 51 is operable to shift the valve member 38 against the action of the spring 49 to the closed position of FIGURE 5. When the pilot valve 40 is closed, the valve portion 44 engages the valve seat 43 and isolates the rearward chamber 37 from the outlet port 27. The flow of gas through the passage 36 quickly balances the pressure on the two sides of the piston head 33 so that the action of the spring 34 moves the poppet 29 to the closed position of FIGURE 5. By utilizing a valve of this nature wherein a large piston head is affected by the pressure of the gas flowing through the system, a very rapid acting valve is provided. During the no-demand period when thrust is not required, the two valves 12 and 13 are open. When unbalanced thrust is required, a signal from the rocket control system is supplied to the solenoid 51 of one valve which operates to close the proper valve 12 or 13 and provide an unbalanced reaction thrust.

In order to conserve the energy of the solid propellant gas generator during the no-demand period of operation, a solid propellant is chosen having a burning rate exponent in the range between zero and one. When the solid propellant has a burning rate exponent in this range, it does not explode and the burning rate is a function of the pressure in the generator. Therefore, as the pressure increases, the burning rate increases and more gas is available. If the burning rate exponent is zero, the same burning rate will be provided regardless of the pressure. Ideally, the propellant selected would have a burning rate exponent approaching one. However, if the burning rate exponent is too close to one, there is a strong possibility of explosion so in practice the exponent should have a burning rate exponent within the range of 0.5 to 0.75 for the reasons discussed below. It should be understood that the term "solid propellant" is intended to cover any fuel oxidizer mixture which burns on its surface regardless of whether it is used to propel a rocket or merely to generate gas under pressure for other uses. In the book entitled "Rocket Propulsion Elements" by George P. Sutton, published by John Wiley & Son, Inc., copyrighted 1956, a table is shown on pages 312 and 313 of various solid propellants listing the burning rate exponents of representative propellants. One suitable propellant would be a rubber base-ammonia nitrate propellant which is a general type of solid propellant having a range of burning rate exponent of 0.1 to 0.8. The particular propellant in this class chosen will normally fall within a range having a burning rate exponent of 0.5 to 0.75 depending upon the particular design requirements. The reasons for choosing this range of exponent values will become apparent from the following discussion.

The burning rate exponent indicated by the letter $n$ is approximated by the following empirical relation: $r = ap^n$ wherein $(r)$ is the burning rate, $(a)$ is a constant, and $(p)$ is the chamber pressure. The chamber pressure $(p)$ may also be expressed by the equation:

$$p = K \left(\frac{A_b}{A_t}\right)^{\frac{1}{1-n}}$$

where $(K)$ is a constant, $(A_b)$ is the area of burning, and $(A_t)$ is the sum of the areas of the nozzle throats. Therefore, it follows that if $P_1$ is the pressure with one nozzle open and $P_2$ is the pressure with all of the nozzles of the system open, then $$\frac{P_1}{P_2} = \left(\frac{A_{t2}}{A_{t1}}\right)^{\frac{1}{1-n}}$$

If there are two nozzles and they each have the same throat size, then $$\frac{P_1}{P_2} = (2)^{\frac{1}{1-n}}$$

The mass flow rate ratio $$\frac{M_1}{M_2}$$

is determined by the formula:

$$\frac{M_1}{M_2} = \frac{(A_{t2})^{\frac{n}{1-n}}}{(A_{t1})}$$

wherein $M_1$ is the mass flow rate when one nozzle is open and $M_2$ is the mass flow rate when all nozzles are open. Similarly, if the two equal nozzles are provided, then $$\frac{M_1}{M_2} = (2)^{\frac{n}{1-n}}$$

If the propellant is chosen to have a burning rate exponent $n$ equal to 0.5 and two nozzles are used, the ratio of $$\frac{M_1}{M_2}$$

will be equal to 2. In such a case, the burning rate during the no-demand period when both of the valves 12 and 13 are open will be one-half as great as the burning rate when the demand is present. If, on the other hand, a propellant is chosen which has a burning rate exponent of 0.75, the ratio $$\frac{M_1}{M_2}$$

will be equal to 8. In such a case, the no-demand period uses a very small amount of the propellant and essentially all of the propellant is available to provide the thrust on demand.

Figure 6:
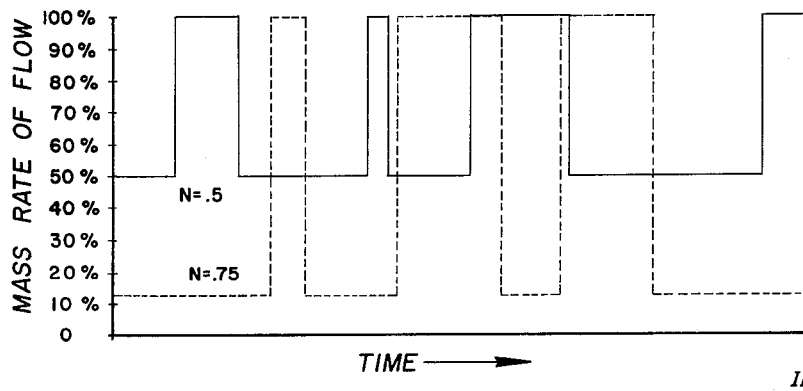
FIGURE 6 is a mass flow rate curve illustrating the operation of the system.

In FIGURE 6, the two curves are shown which illustrate the demand versus no-demand ratio for propellants having a burning rate exponent of 0.5 and 0.75 respectively. The area below the curve represents the amount of propellant used so it is apparent that when thrust is not required, a low burning rate conserves the propellant. The amount of conservation of propellant during the no-demand period is a function of the value of the burning rate exponent and so propellants having higher burning rate exponents provide higher efficiencies. However, the practical limitations of safety normally prevent the use of a propellant having a burning rate exponent above 0.75 since there is a danger of explosions when the exponent value approaches one.

By utilizing a system in which opposed nozzles balance their thrust during the no-demand period, it is possible to greatly conserve the propellant within the solid propellant generator and provide a lightweight, highly compact system for stabilizing rockets or the like.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description are determinative of the scope of the invention.

I claim:

An apparatus to provide intermittent thrust stabilization in rockets and the like comprising: a gas generator, a solid propellant in said generator having a burning rate which increases as a function of increased pressure therein, means for igniting said propellant, a pair of similar opposed stabilization nozzles, means connecting each nozzle to said generator, each nozzle having individually associated therewith a valve responsive to gas flow from said gas generator and normally held open thereby, and means for selectively closing said valves, the closure of one of said valves thereby isolating its associated nozzle from said gas generator and increasing the pressure in the latter, whereby the propellant burns at an increased rate and the gas discharge through the other valve and associated nozzle is increased.

References Cited in the file of this patent

UNITED STATES PATENTS

| | | |
|---|---|---|
| 926,389 | Collin | June 29, 1909 |
| 2,555,333 | Grand et al. | June 5, 1951 |
| 2,726,510 | Goddard | Dec. 13, 1955 |
| 2,974,594 | Boehm | Mar. 14, 1961 |

FOREIGN PATENTS

| | | |
|---|---|---|
| 879,835 | France | Dec. 10, 1942 |
| 1,130,132 | France | Sept. 17, 1956 |

OTHER REFERENCES

"Text on Rocket Propulsion Elements," G. P. Sutton, John Wiley & Sons, Inc., pages 312–313, published 1956.